US012761839B2

(12) United States Patent
Mizusawa

(10) Patent No.: US 12,761,839 B2
(45) Date of Patent: Oct. 13, 2026

(54) PRINT CONTROL DEVICE, PRINT CONTROL METHOD, AND STORAGE MEDIUM STORING PRINT CONTROL PROGRAM

(71) Applicant: SEIKO EPSON CORPORATION, Tokyo (JP)

(72) Inventor: Nobutada Mizusawa, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 260 days.

(21) Appl. No.: 18/582,717

(22) Filed: Feb. 21, 2024

(65) Prior Publication Data

US 2024/0295994 A1 Sep. 5, 2024

(30) Foreign Application Priority Data

Mar. 1, 2023 (JP) ................................. 2023-030796

(51) Int. Cl.
*G06F 3/12* (2006.01)

(52) U.S. Cl.
CPC ............ *G06F 3/1204* (2013.01); *G06F 3/121* (2013.01); *G06F 3/1253* (2013.01); *G06F 3/1274* (2013.01)

(58) Field of Classification Search
CPC ...... G06F 3/1204; G06F 3/121; G06F 3/1253; G06F 3/1274; G06F 3/12
See application file for complete search history.

(56) References Cited

U.S. PATENT DOCUMENTS

2008/0288879 A1* 11/2008 Tomita ............... H04N 1/00973 715/762
2013/0081081 A1* 3/2013 Wang ............... H04N 21/25875 725/38
2016/0343350 A1* 11/2016 Khoury ................. G06F 3/0481
2022/0291883 A1* 9/2022 Uruma .................. G06F 3/1205
2023/0208989 A1* 6/2023 Kanamori .......... H04N 1/00464 358/1.14
2024/0402963 A1* 12/2024 Kakitsuba ............. G06F 3/1255

FOREIGN PATENT DOCUMENTS

JP 2008286978 B 2/2010

* cited by examiner

*Primary Examiner* — Iriana Cruz
(74) *Attorney, Agent, or Firm* — CHIP LAW GROUP

(57) ABSTRACT

Disclosed is a print control device coupled to a print device including a plurality of hardware buttons. The print control device includes an acquirer configured to acquire, from the print device, state information indicating a state of the print device, and a controller configured to, in accordance with the state information, select, among the plurality of hardware buttons, a hardware button to be displayed as a software button by a display and to cause the display to display the software button for receiving an operation corresponding to the selected hardware button.

9 Claims, 12 Drawing Sheets

FIG. 10

TA1

| | |
|---|---|
| ON-TIME PERIOD | TM |
| NUMBER OF OPERATIONS OF PAUSE BUTTON | N1 |
| NUMBER OF OPERATIONS OF CANCEL BUTTON | N2 |
| NUMBER OF OPERATIONS OF FRONT FEED BUTTON | N3 |
| NUMBER OF OPERATIONS OF BACK FEED BUTTON | N4 |
| NUMBER OF OPERATIONS OF CUT BUTTON | N5 |

FIG. 11

TA2

| FREQUENCY GROUP | FREQUENCY OF OPERATION PER HOUR Ni/TM | PLACEMENT OF SOFTWARE BUTTON |
|---|---|---|
| G1 | 5 TIMES OR MORE | CLOSE TO LEFT, INCREASE SIZE |
| G2 | 1 TIME OR MORE AND LESS THAN 5 TIMES | PLACE RIGHT TO FREQUENCY G1 AND SET STANDARD SIZE |
| G3 | LESS THAN 1 TIME | HIDE |

TA3

| | |
|---|---|
| ON-TIME PERIOD | TM |
| NUMBER OF OPERATIONS OF CANCEL BUTTON AS HARDWARE BUTTON | NH |
| NUMBER OF OPERATIONS IN CANCEL OPERATION AREA | NS |

PRINT CONTROL DEVICE, PRINT CONTROL METHOD, AND STORAGE MEDIUM STORING PRINT CONTROL PROGRAM

The present application is based on, and claims priority from JP Application Serial Number 2023-030796, filed Mar. 1, 2023, the disclosure of which is hereby incorporated by reference herein in its entirety.

BACKGROUND

1. Technical Field

The present disclosure relates to a print control device coupled to a print device including a plurality of hardware buttons, a print control method, and a non-transitory computer-readable storage medium storing a print control program.

2. Related Art

A print device including a display panel and a plurality of hardware buttons is known as a print device. JP-A-2008-286978 describes techniques of displaying a plurality of software buttons, which correspond to a plurality of hardware buttons, on a display of a personal computer (PC) coupled to an image forming device. The plurality of software buttons are placed in the same manner as the plurality of hardware buttons are placed.

It is desirable to improve the operability of a print device from an external device coupled to the print device.

SUMMARY

According to an aspect of the present disclosure, a print control device coupled to a print device including a plurality of hardware buttons is provided. The print control device includes an acquirer configured to acquire, from the print device, state information indicating a state of the print device, and a controller configured to, in accordance with the state information, select, among the plurality of hardware buttons, a hardware button to be displayed as a software button by a display and to cause the display to display the software button for receiving an operation corresponding to the selected hardware button.

According to another aspect of the present disclosure, a print control method for controlling a print device including a plurality of hardware buttons is provided. The print control method includes an acquiring step of acquiring, from the print device, state information indicating a state of the print device, and a controlling step of, in accordance with the state information, selecting, among the plurality of hardware buttons, a hardware button to be displayed as a software button by a display and causing the display to display the software button for receiving an operation corresponding to the selected hardware button.

According to another aspect of the present disclosure, a non-transitory computer-readable storage medium storing a print control program for controlling a print device including a plurality of hardware buttons is provided. The print control program causes a computer to implement an acquiring function of acquiring, from the print device, state information indicating a state of the print device, and a controlling function of, in accordance with the state information, selecting, among the plurality of hardware buttons, a hardware button to be displayed as a software button by a display and causing the display to display the software button for receiving an operation corresponding to the selected hardware button.

BRIEF DESCRIPTION OF THE DRAWINGS

FIG. 10 schematically illustrates an exemplary structure of a summary table for calculating the frequency of use of each software button.

FIG. 11 schematically illustrates an exemplary structure of a processing table defining the placement of software buttons in accordance with the frequency of use.

DESCRIPTION OF EMBODIMENTS

Figure 1:
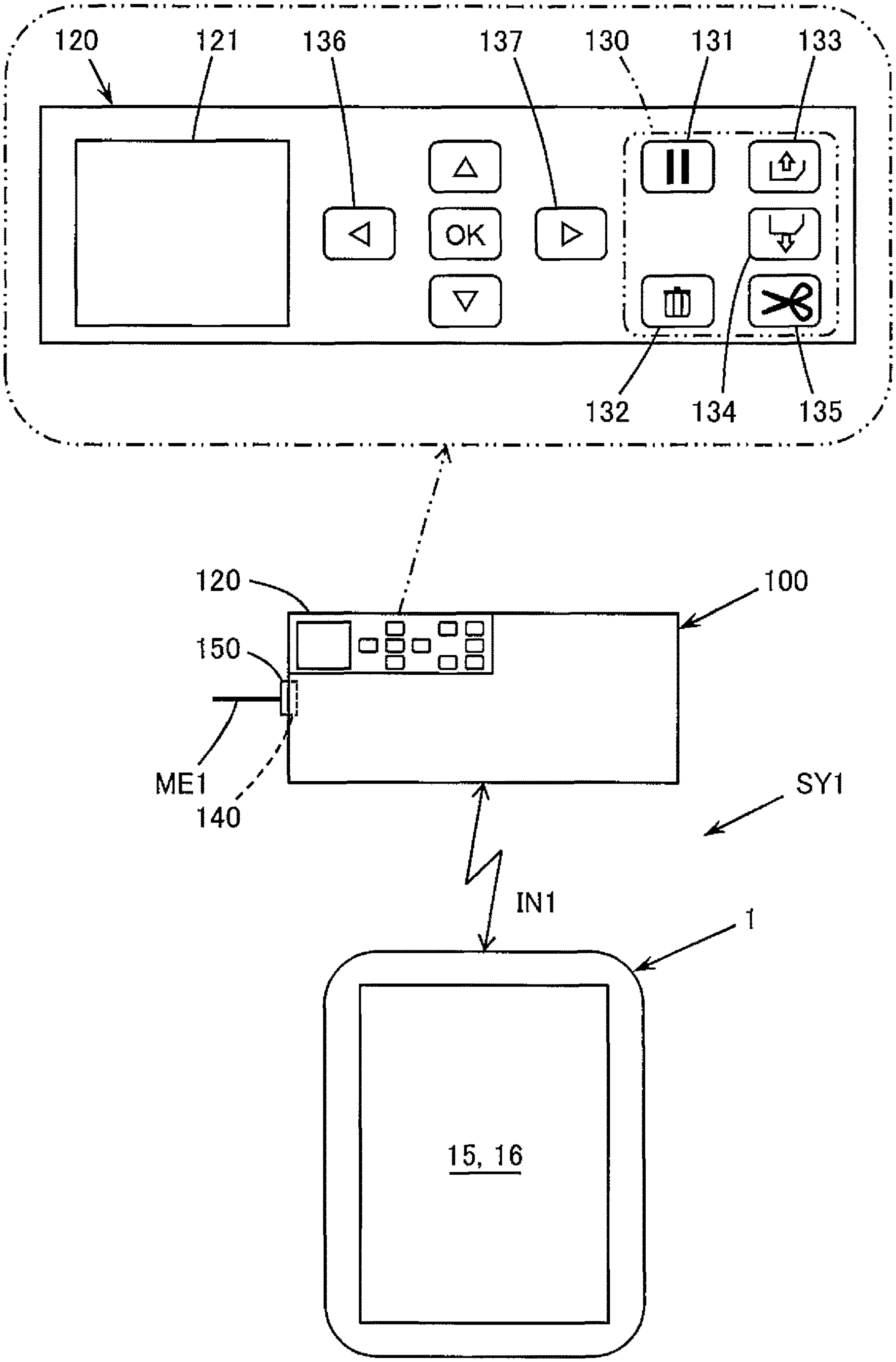
FIG. 1 is a simplified view schematically illustrating an exemplary configuration of a print system.

Embodiments according to the present disclosure will be described below. Of course, the embodiments described below are merely illustrative of the present disclosure, and not all of the features illustrated in the embodiments are essential to the inventive solution.

1. OUTLINE OF TECHNIQUES INCLUDED IN PRESENT DISCLOSURE

First of all, the outline of techniques included in the present disclosure will be described with reference to FIGS. 1 to 14. The figures of the present application schematically illustrate examples. The magnification factors in directions may differ from each other in the figures, and the figures may be inconsistent with each other. Of course, components of the present techniques are not limited to specific examples denoted by reference numerals. In the "Outline of Techniques Included in Present Disclosure" section, descriptions in parentheses provide supplementary explanations for the immediately preceding words.

First Aspect

Figure 3:
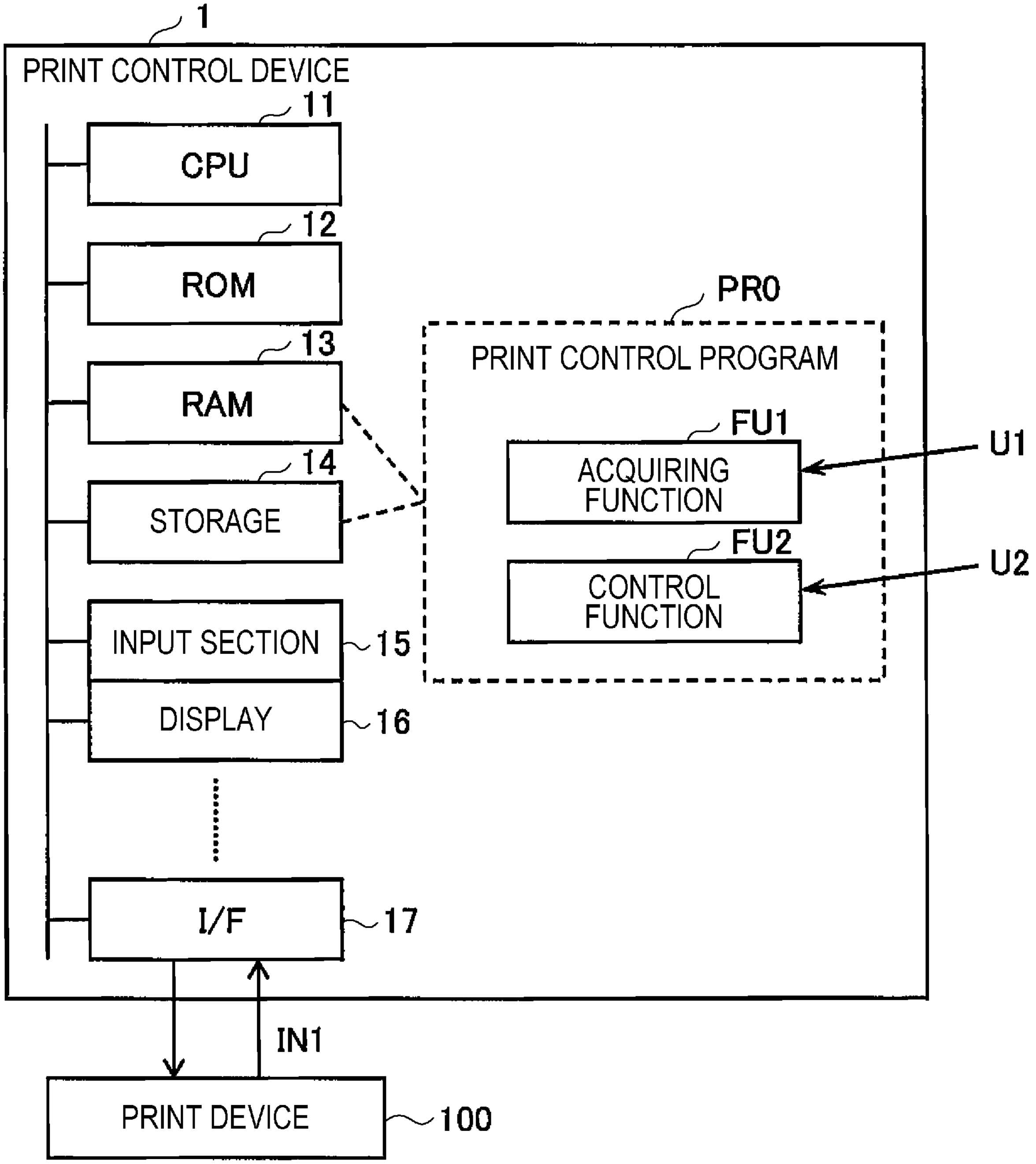
FIG. 3 is a block diagram schematically illustrating an exemplary configuration of a print control device.

As illustrated in FIGS. 1 and 3, a print control device 1 according to an aspect of the present techniques is the print control device 1 coupled to a print device 100 including a plurality of hardware buttons 130. The print control device 1 includes an acquirer U1 and a controller U2. The acquirer U1 acquires, from the print device 100, state information IN1 indicating the state of the print device 100. As depicted in, for example, FIGS. 4 to 7 and 9, in accordance with the state information IN1, the controller U2 selects, among the plurality of hardware buttons 130, a hardware button for which a software button 230 is caused to be displayed by the display 16 and causes the display 16 to display the software button 230 that receives an operation corresponding to the selected hardware button.

When all of the software buttons 230 corresponding to the plurality of hardware buttons 130 are displayed, the user may have to use different software buttons 230 depending on the state of the print device 100, which is inconvenient.

In the aspect described above, the software button 230 for receiving an operation corresponding to the hardware button selected depending on the state of the print device 100 is displayed on the display 16. Accordingly, the aspect described above may provide a print control device that facilitates remote operation of a print device via a software button.

Second Aspect

Figure 5:
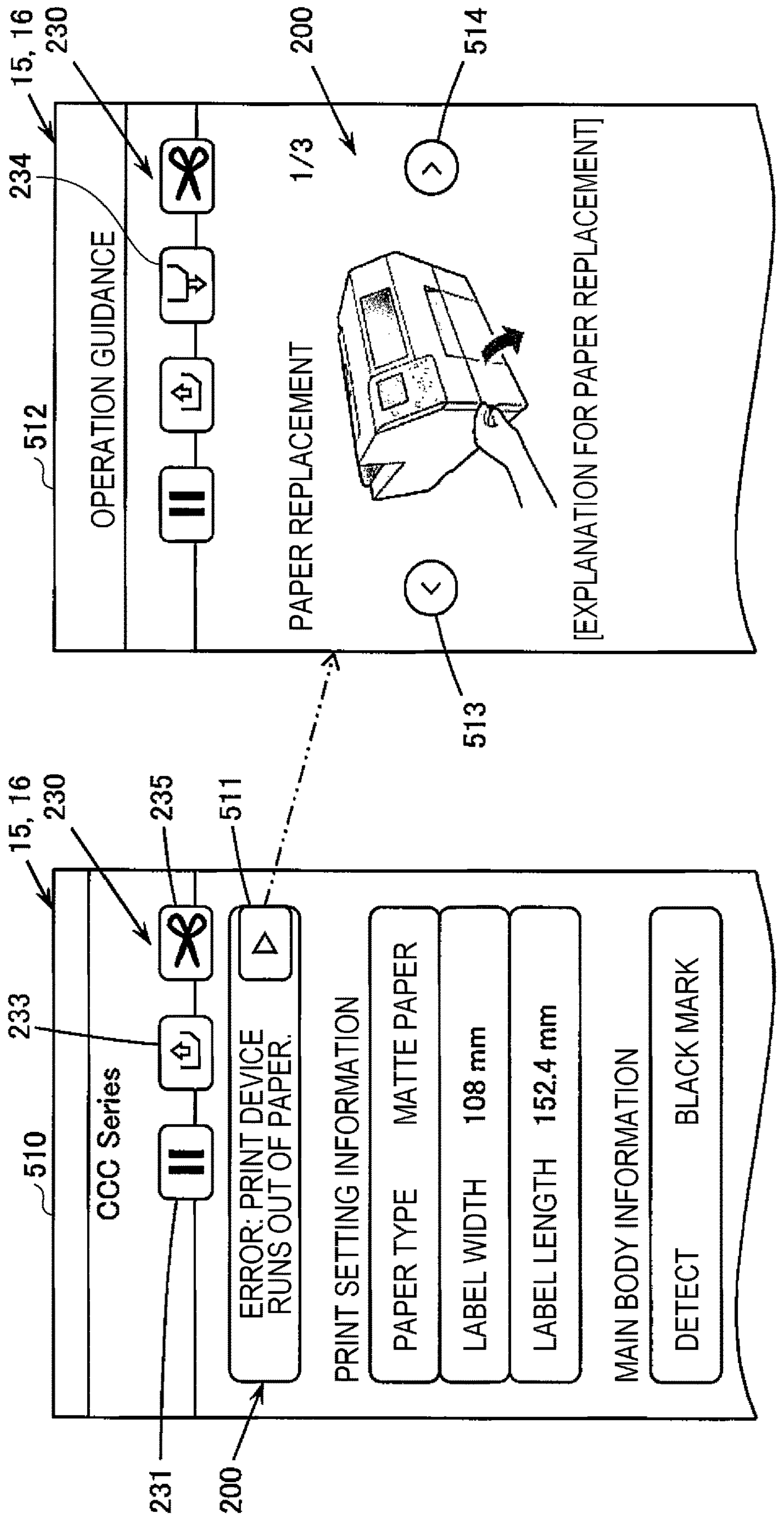
FIG. 5 simply depicts an exemplary display of a media depletion notification screen and a guidance screen.
Figure 6:
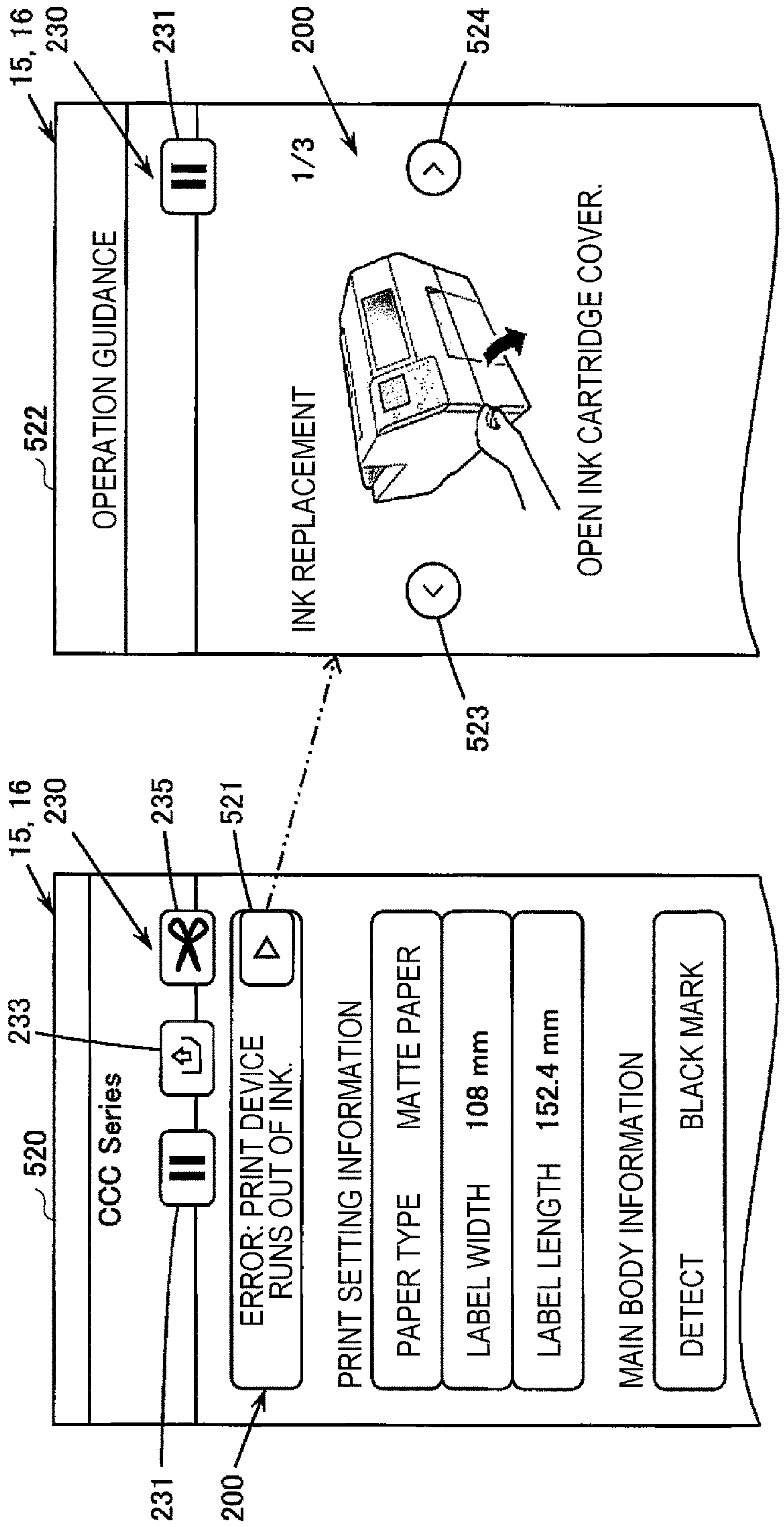
FIG. 6 simply depicts exemplary displays of an ink depletion notification screen and a guidance screen.

As depicted in, for example, FIG. 5 or 6, the controller U2 may cause the display 16 to display a screen appearing after switching depending on the state of the print device 100 indicated by the state information IN1 and may cause the display 16 to display the software button 230 in accordance with the screen. This aspect may provide a desirable example that facilitates remote operation of the print device via a software button.

Third Aspect

As depicted in, for example, FIG. 5 or 6, when the state information IN1 indicates an error state of the print device 100, the controller U2 may cause the display 16 to display, as the screen, a guidance screen (for example, a guidance screen 512 or 522) for clearing the error state. The controller U2 may cause the display 16 to display the software button 230 in accordance with the guidance screen (512 or 522). This aspect may provide a desirable example that facilitates remote operation of the print device 100 via a software button while the print device 100 is in an error condition.

Fourth Aspect

As illustrated in FIG. 1, the plurality of hardware buttons 130 may include a cancel button 132 for receiving an operation of cancelling a print job held by the print device 100 while the operation of the print device 100 is temporarily stopped. As, for example, depicted in FIG. 7 and illustrated in FIG. 9, when the state information IN1 indicates a temporary stop state of the operation, which is a hold state of the print job, the controller U2 may be configured to cause the display 16 to display a cancel operation area 540 for receiving an operation of cancelling the print job. This aspect may facilitate remote operation of software corresponding to a cancel button.

Fifth Aspect

As illustrated in FIG. 1, the print device 100 may include a second display (for example, a display panel 121). As illustrated in FIG. 8, the print device 100 may be configured to, in response to receiving an operation performed on the cancel button 132, cause the second display (121) to display a second cancel operation area 160 for receiving a selection of whether to cancel part of the print job held by the print device 100 or to cancel the whole of the print job. As, for example, depicted in FIG. 7 and illustrated in FIG. 9, the controller U2 may be configured to cause the display 16 to display the cancel operation area 540 for receiving a selection of whether to cancel part of the print job or to cancel the whole of the print job.

In the above case, even when a cancel button, which is a software button, is not operated, the cancel operation area 540 corresponding to the second display cancel operation area 160 displayed on the second display (121) is displayed on the display 16. Accordingly, the above aspect may further facilitate remote operation of software corresponding to a cancel button.

Here, when cancelling part of a print job, the controller may delete the first page in the print job or may delete, for example, an intermediate page in the print job. This additional note applies to the aspects given below.

Sixth Aspect

Figures 13, 14:
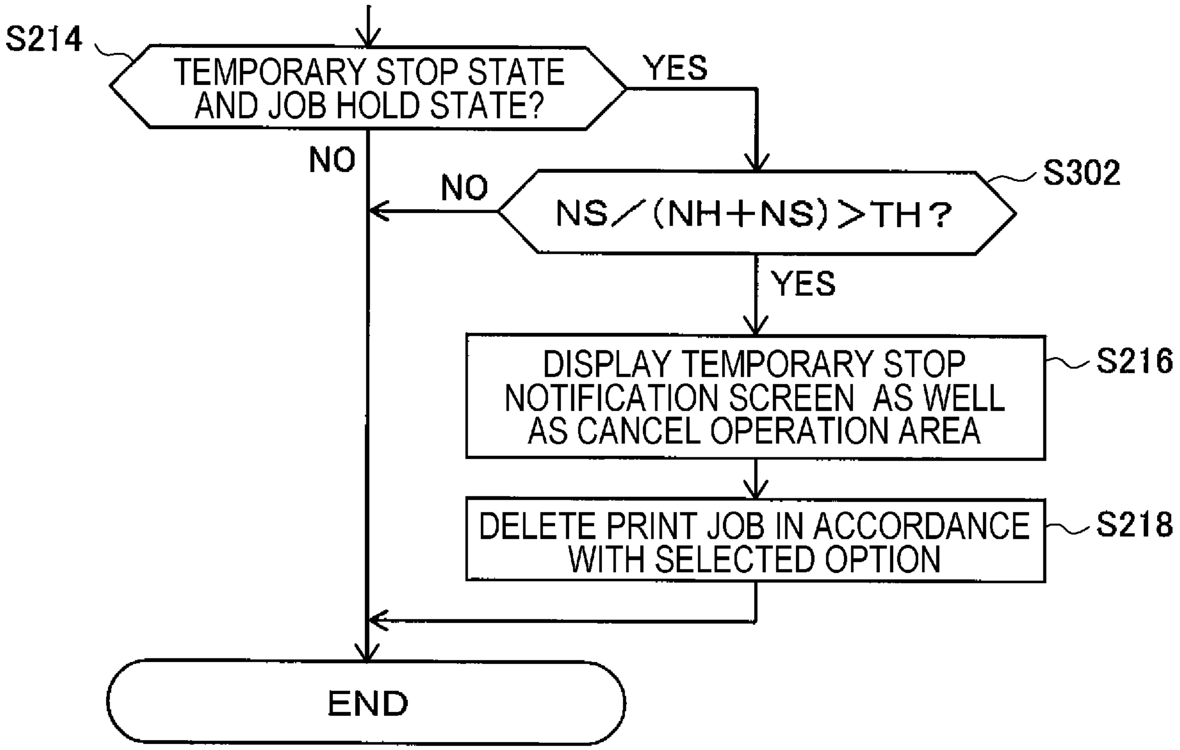
FIG. 13 schematically illustrates an exemplary structure of a summary table for calculating the frequency of use of a cancel operation area.
FIG. 14 is a flowchart illustrating another exemplary process of the print control device.

As illustrated in FIGS. 13 and 14, in response to determining, based on a first frequency of use (for example, NH/TM), which is a frequency at which the cancel button 132 is used, and a second frequency of use (for example, NS/TM), which is a frequency at which the cancel operation area 540 is used, that the second frequency of use (NS/TM) exceeds a reference frequency, the controller U2 may cause the display 16 to display the cancel operation area 540. In response to determining that the second frequency of use (NS/TM) does not exceed the reference frequency, the controller U2 may not cause the second display 16 to display the cancel operation area 540. NH/TM means the ratio of the number of operations of the cancel button 132 (hardware button) relative to the on-time period TM, and NS/TM means the ratio of the number of operations of a cancel button (software button) relative to the on-time period TM.

In the above case, when the frequency of use is high, the cancel operation area 540 is displayed on the display 16. Accordingly, the above aspect may further facilitate operation of a print device.

The terms "first", "second", . . . used herein are terms for identifying each element among a plurality of elements having similarities and do not mean the order of elements. This additional note applies to the aspects given below.

Seventh Aspect

Figure 12:
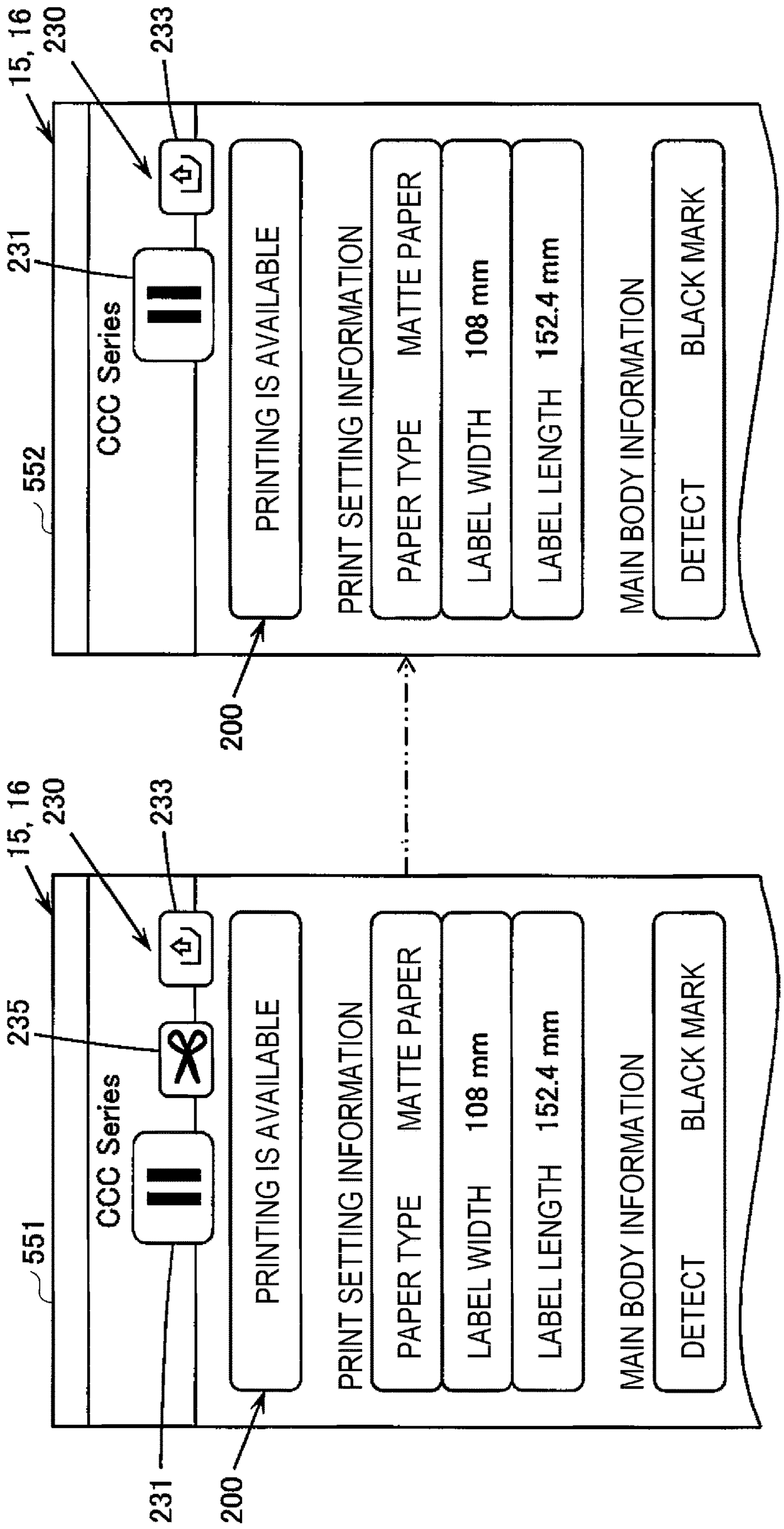
FIG. 12 simply depicts an exemplary change in a home screen.

As illustrated in FIGS. 10 to 12, the controller U2 may acquire the frequency of use (for example, Ti/TM) of the software button 230 corresponding to each of the hardware buttons 130 and may cause the display 16 to display the software buttons 230 placed in accordance with the respective frequencies of use (Ti/TM). For example, the frequency of use of a pause button 231 is denoted by N1/TM, where Ni is the number of pause button operations and TM is the on-time period, and the frequency of use of a front feed button 233 is denoted by N3/TM, where N3 is the number of front feed button operations N3 and TM is the on-time period.

In the above case, the software button 230 displayed on the display 16 is placed in accordance with the frequency of use (Ti/TM). Accordingly, the above aspect may further facilitate remote operation of a print device using a software button.

Eighth Aspect

Figure 9:
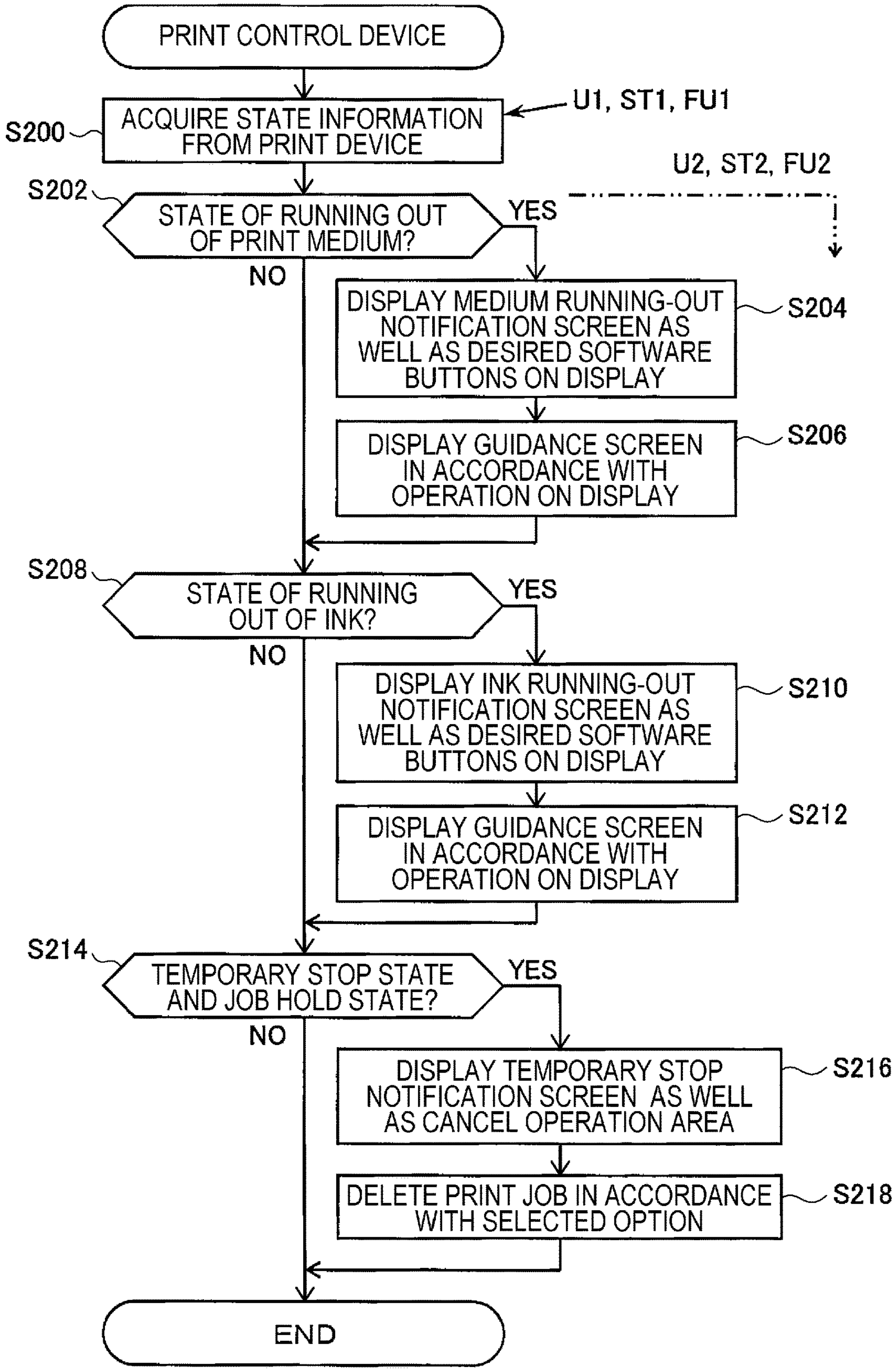
FIG. 9 is a flowchart schematically illustrating an exemplary process of a print control device.

As illustrated in FIG. 9, a print control method according to an aspect of the present techniques includes an acquiring step ST1 corresponding to the acquirer U1 mentioned above and a controlling step ST2 corresponding to the controller U2 mentioned above. This aspect may provide a print control method that facilitates remote operation of a print device via a software button.

Ninth Aspect

In addition, as illustrated in FIGS. 3 and 9, a print control program PRO according to an aspect of the present techniques causes a computer (for example, the print control device 1) to implement an acquiring function FU1 corresponding to the acquirer U1 and a control function FU2 corresponding to the controller U2. This aspect may provide a print control program that facilitates remote operation of a print device via a software button.

Furthermore, the present techniques may be applied to a multi-function device including the print control device described above, a print system including the print control device described above, a printing method for the print system, a control program for the print system mentioned above, a computer-readable medium on which a control program for any of the foregoing is recorded, and so on. Any of the devices described above may be constituted by a plurality of distributed portions.

2. FIRST SPECIFIC EXAMPLE OF PRINT SYSTEM

Figure 2:
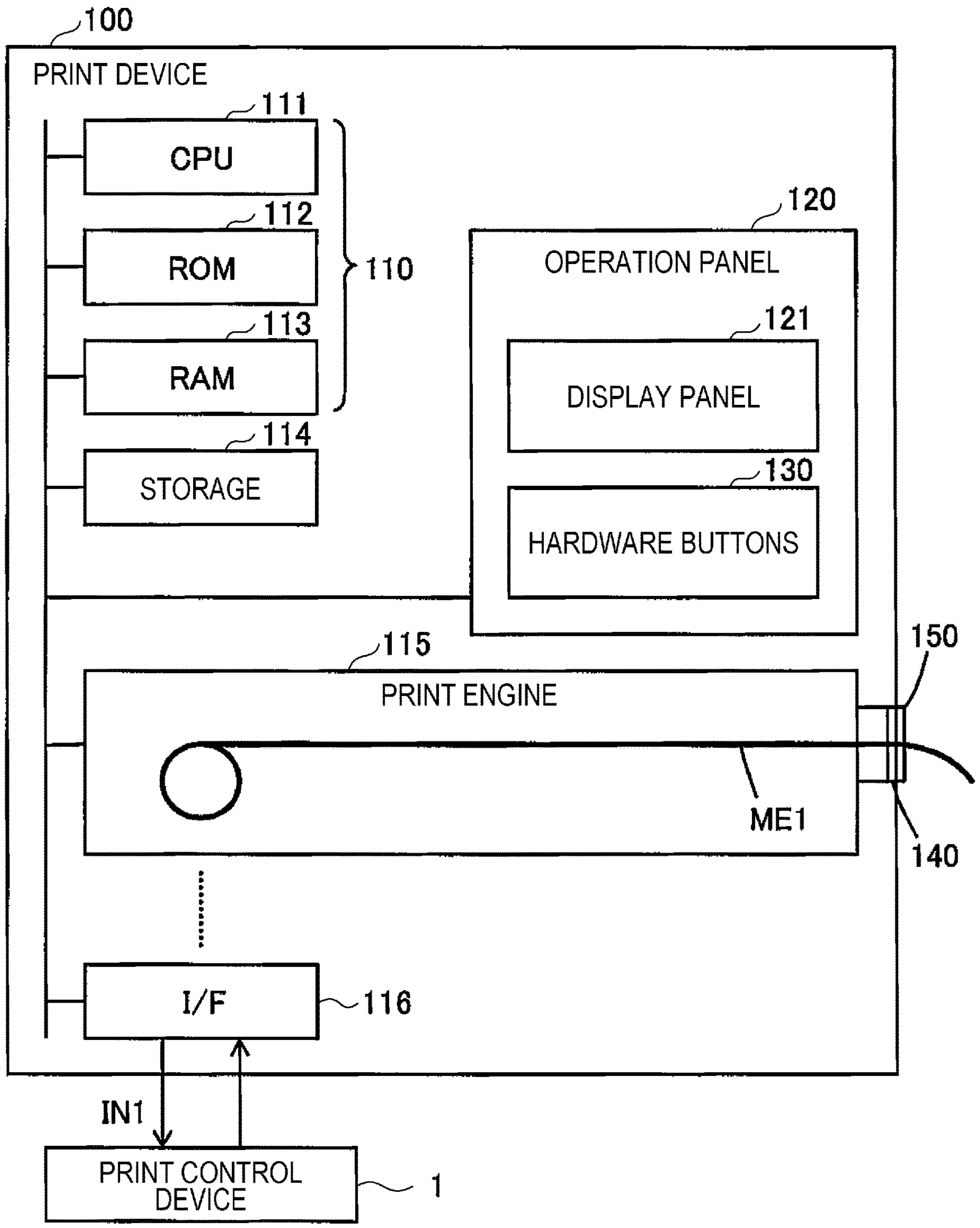
FIG. 2 is a block diagram schematically illustrating an exemplary configuration of a print device.

FIG. 1 schematically illustrates a configuration of a print system SY1 including the print device 100 and the print control device 1. At the top of FIG. 1, an operation panel 120 is displayed in an enlarged manner. The print system SY1 may include an additional element that is not illustrated in FIG. 1. FIG. 2 schematically illustrates a configuration of the print device 100.

The print device 100 illustrated in FIGS. 1 and 2 is a printer that performs printing on an elongated print medium ME1, such as a label sheet consisting of an adhesive sheet pasted onto a backing sheet, and is coupled to the print control device 1 intended for remote control. The print device 100 may be an ink jet printer or may be an electrophotographic printer such as a laser printer. If the print device 100 is, for example, placed at a height or placed sideways, a situation occurs in which it is difficult for the user to operate the hardware button 130 of the print device 100. To address this situation, the print device 100 is coupled to the print control device 1 intended for remote operation. The print control device 1 may be a personal computer including a tablet terminal, or a portable phone such as a smartphone. Although it is desirable that the print device 100 and the print control device 1 be connected wirelessly, the print device 100 and the print control device 1 may be coupled in a wired manner. Wireless connection of the wireless fidelity (Wi-Fi; registered trademark) method including the Wi-Fi Direct method, wireless connection using short range wireless communication, wireless connection via the Internet, and so on may be used for the wireless connection between the print device 100 and the print control device 1.

The print medium ME1 is a material on which a print image is printed and is assumed in the present specific example to be an elongated label sheet, which is unrolled from a roll so as to form a print image on the adhesive sheet. Of course, the print medium ME1 may be a cut material such as a cut sheet. The adhesive sheet of a label sheet includes an adhesive on the back surface. Of course, various materials such as resin, paper, and metal may be used as the material for the print medium ME1, and the print medium ME1, which is not limited to a label sheet, may be a single-layer sheet or the like.

The print device 100 includes a CPU 111, which is a processor, a ROM 112, which is a semiconductor memory, a RAM 113, which is a semiconductor memory, a storage 114, a print engine 115, an I/F 116, an operation panel 120, and so on. Regarding terms used herein, "CPU" is an abbreviation for "central processing unit", "ROM" is an abbreviation for "read-only memory", "RAM" is an abbreviation for "random access memory", and "I/F" is an abbreviation for "interface". The components 111 to 116, 120, and so on mentioned above are electrically coupled to each other and are therefore able to input and output information from and to each other. The CPU 111, the ROM 112, and the RAM 113 are included in the controller 110. The processor constituting the controller 110 is not limited to a single CPU and may be hardware circuitry of a plurality of CPUs and an ASIC, a combination of a CPU and hardware circuitry, or the like. Herein, "ASIC" is an abbreviation for "application-specific integrated circuit". The storage 114 stores firmware and so on. The CPU 111 appropriately reads out information stored in the storage 114 onto the RAM 113 and uses the information for processing of the print device 100. As the storage 114, a nonvolatile semiconductor memory such as a flash memory, a magnetic storage device such as a hard disk, or the like may be used. The print engine 115 performs printing on the print medium ME1. The print engine 115 may be a printing mechanism of an ink jet method or may be a printing mechanism of an electrophotographic printing method such as a laser method. The print engine 115 in the present specific example is assumed to generate a print by ejecting ink droplets on the elongated print medium ME1 unrolled from the role. The print device 100 in the present specific example includes a cutter 140, which cuts a print, in a discharger 150. The I/F 116 transmits and receives information to and from the print control device 1, such as transmitting the state information IN1 indicating the state of the print device 100 to the print control device 1. When the state of the print device 100 changes, the controller 110 outputs the state information IN1 via the I/F 116 to the print control device 1.

The operation panel 120 includes the display panel 121 and a plurality of hardware buttons. As a left button 136, a right button 137, and so on are provided as the hardware buttons, no touch panel is provided on the surface of the display panel 121.

The display panel 121 is an example of a second display that displays, for example, the second cancel operation area 160, which is described with reference to FIG. 8. In response to receiving an operation performed on the cancel button 132, the print device 100 causes the display panel 121 to display the second cancel operation area 160, which receives a selection of whether to cancel only the first page of the print job held by the print device 100 or to cancel the whole print job. A liquid crystal display panel or the like may be used as the display panel 121.

A plurality of hardware buttons on the operation panel 120 include a pause button 131, a cancel button 132, a front feed button 133, a back feed button 134, a cut button 135, a left button 136, a right button 137, and the like. These hardware buttons are placed in an area of the operation panel 120 different from the area of the display panel 121. Each hardware button has a different pattern. In the present specific example, the plurality of hardware buttons 130 corresponding to the plurality of software buttons 230 depicted in FIG. 4 and the subsequent figures are assumed to be buttons (131 to 135) in a small enclosure indicated by a dash-dot-dot line in FIG. 1.

The pause button 131 is a hardware button for receiving an operation of providing an instruction to temporarily stop a printing operation, to cancel the temporary stop, or the like. The cancel button 132 is a hardware button for receiving an operation of providing an instruction to cancel a print job, or the like. While the print device 100 is temporarily stopped, the cancel button 132 receives an operation of cancelling a print job held by the print device 100. The front feed button 133 is a hardware button for receiving an operation of feeding the print medium ME1 in a discharge direction. The discharge direction means a direction in which the print medium ME1 is discharged from the discharger 150. The back feed button 134 is a hardware button for receiving an operation of moving the print medium ME1 in a winding direction opposite to the discharge direction. The cut button 135 is a hardware button for receiving an operation of providing an instruction to cut the print medium ME1.

FIG. 3 schematically illustrates a configuration of the print control device 1. The print control device 1 includes a CPU 11, a ROM 12, a RAM 13, a storage 14, an input section 15, a display 16, an I/F 17, and so on. The components 11 to 17 and so on mentioned above are electrically coupled to each other and therefore able to input and output information from and to each other. The processor constituting the print control device 1 is not limited to a single CPU and may be hardware circuitry of a plurality of CPUs and an ASIC, a combination of a CPU and hardware circuitry, or the like. The storage 14 stores the print control program PRO that is software for controlling the print device 100. The CPU 11 appropriately reads out information stored in the storage 14 onto the RAM 13 and uses the information for print control processing. As the storage 14, a nonvolatile semiconductor memory such as a flash memory, a magnetic storage device such as a hard disk, or the like may be used. As the input section 15, a touch panel affixed to the surface of the display 16, a hard key, a pointing device, or the like may be used. As the display 16, a liquid crystal display panel or the like may be used. The I/F 17 transmits and receives information to and from the print device 100, such as receiving the state information IN1 from the print device 100.

By executing the print control program PRO read out and loaded onto the RAM 13, the CPU 11 causes the print control device 1 to implement the acquiring function FU1 and the control function FU2. The I/F 17 and the CPU 11 that executes the print control program PRO of a portion corresponding to the acquiring function FU1 correspond to the acquirer U1 that acquires the state information IN1 from the print device 100. The CPU 11 that executes the print control program PRO for a portion corresponding to the control function FU2 corresponds to the controller U2 that causes the display 16 to display the software buttons 230 depicted in FIG. 4 and other figures. The print control device 1 that executes the print control program PRO performs the acquiring step ST1 and the controlling step ST2 illustrated in FIG. 9. A computer-readable recording medium storing the print control program PRO for causing a computer to implement the functions (FU1 and FU2) mentioned above is not limited to a storage inside the print control device 1 and may be a storage medium outside the print control device 1.

When all of the software buttons 230 corresponding to the plurality of hardware buttons 130 are displayed on the display 16 of the print control device 1, the user may have to use the software buttons 230 depending on the state of the print device 100, which is inconvenient. To address this, in the present specific example, the software buttons 230 displayed on the display 16 are selected depending on the state of the print device 100.

Figure 4:
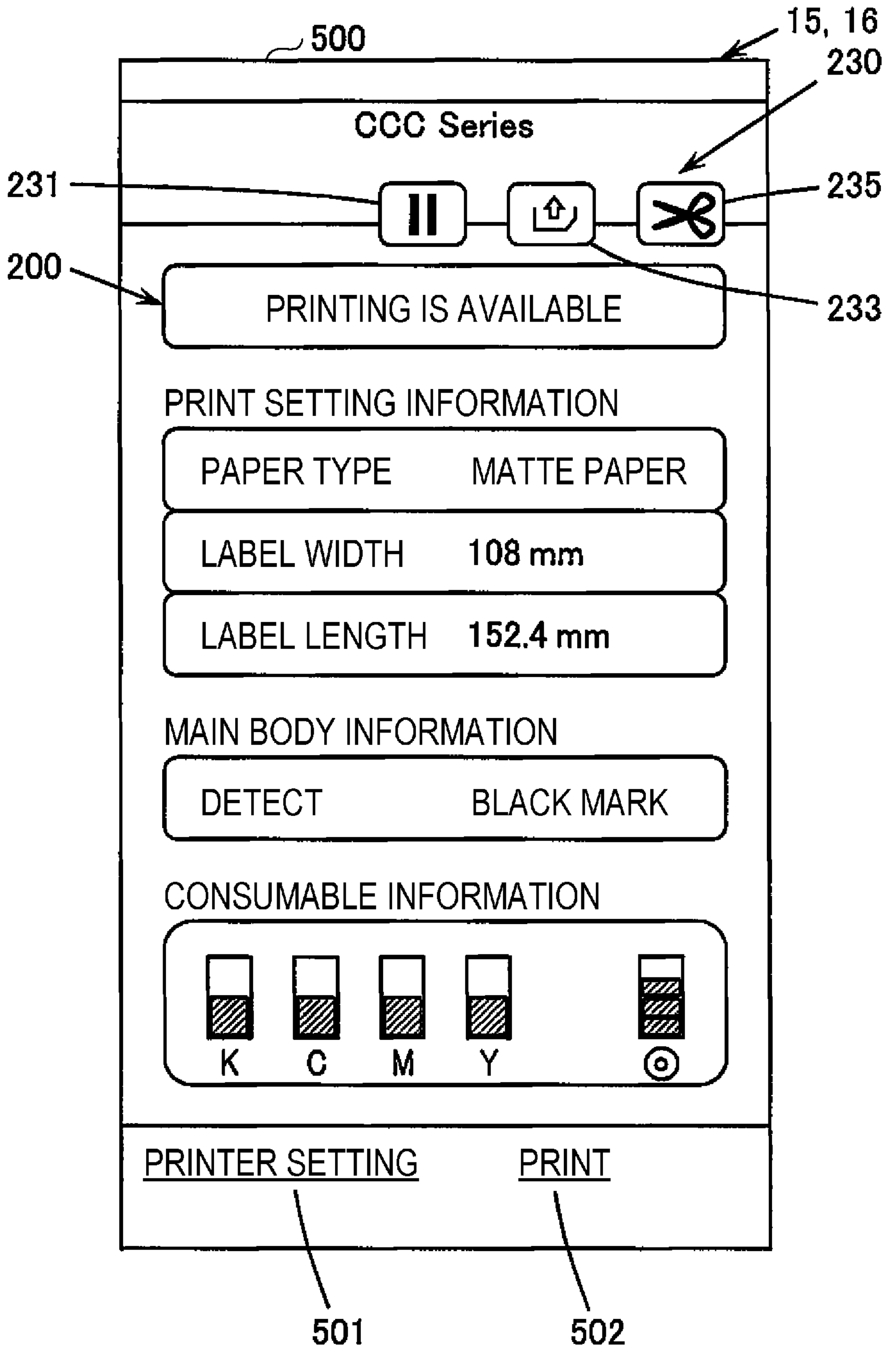
FIG. 4 simply depicts an exemplary display of a home screen.

FIG. 4 simply depicts a home screen 500 displayed on the display 16. The home screen 500 is a static screen that first appears upon start of the print control program PRO, and is a screen to which another screen is able to return.

The controller U2 causes, for example, a state 200 of the print device 100 in addition to the setting operation area 501, a print instruction area 502, and one or more software buttons 230 to be displayed on the home screen 500. The controller U2 performs processing of displaying the state 200 of the print device 100 on the home screen 500 based on the state information IN1 acquired via the I/F 17 from the print device 100. For example, when printing may be performed while a print job is not held, the print device 100 generates the state information IN1 indicating a state of normally waiting for a printing instruction and transmits the state information IN1 to the print control device 1. The print control device 1 that has received the state information IN1 displays a message saying “Printing is available” on the home screen 500. The controller U2 causes the setting information of the print medium ME1, the main body information of whether or not to detect a black mark of a print, consumable information indicating the remaining amounts of ink and the print medium ME1, and so on to be displayed on the home screen 500. In the consumable information, K, C, M, and Y denote black ink, cyan ink, magenta ink, and yellow ink, respectively, and the indicator at the right end indicates the remaining amount of the print medium ME1.

The print control device 1 receives operations performed on the components (501, 502, and 230) mentioned above via the input section 15 and performs processing in accordance with the operated components. When the input section 15 is a touch panel, the user may operate the components (501, 502, and 230) by touching the display area of each of the components (501, 502, and 230), for example, by hand. When the input section 15 is a pointing device, the user may operate each of the components (501, 502, and 230) by performing an operation of placing a pointer (not depicted) over the component (501, 502, or 230) display area and selecting the component by using the pointing device.

In response to receiving an operation performed in the setting operation area 501, the print control device 1 displays a screen for receiving settings on print setting information, main body information, and so on and receives the settings. In response to receiving an operation performed in the print instruction area 502, the print control device 1 performs processing of generating a print job and transmitting the print job to the print device 100.

When the print device 100 normally waits for a print instruction, a cancel button for providing an instruction to cancel a print job and a back feed button for providing an instruction to wind up the print medium ME1 are usually not used. Therefore, the controller U2 causes the display 16 to display three software buttons (231, 233, and 235) that receive operations corresponding to the hardware buttons (131, 133, and 135), which are some of the plurality of hardware buttons 130 illustrated in FIG. 1. The software buttons (231, 233, and 235) have the patterns of the hardware buttons (131, 133, and 135), respectively. In response to receiving an operation performed on the pause button 231, which is a software button, the print control device 1 instructs the print device 100 to perform processing that is performed when an operation performed on the pause button 131, which is a hardware button, is received. In response to receiving an operation performed on the front feed button 233, which is a software button, the print control device 1 instructs the print device 100 to perform processing that is performed when an operation performed on the front feed button 133, which is a hardware button, is received. In response to receiving an operation performed on the cut button 235, which is a software button, the print control device 1 instructs the print device 100 to perform processing that is performed when an operation performed on the cut button 135, which is a hardware button, is received.

When an error occurs in the print device 100 due to, for example, depletion of print media or depletion of ink, the print device 100 transmits the state information IN1 indicating such an error state to the print control device 1. In response to receiving the state information IN1, the print control device 1 displays a notification screen (510 or 520) depicted on the left in FIG. 5 or FIG. 6 based on the state information IN1. If an operation performed on a guidance display button 511 or 521 is received, the print control device 1 displays the guidance screen 512 or 522.

On the left in FIG. 5, a media depletion notification screen 510 for providing a notification that the print device runs out of the print medium ME1 is depicted.

In response to receiving, from the print device 100, the state information IN1 indicating depletion of print media as an error state, the print control device 1 displays the guidance display button 511 as well as a message saying, "error: Print device runs out of paper." on the media depletion notification screen 510. The software buttons 230 displayed on the media depletion notification screen 510 are the same software buttons (231, 233, and 235) as the software buttons on the home screen 500 depicted in FIG. 4.

In response to receiving an operation performed on the guidance display button 511, the print control device 1 displays a guidance screen 512 for addressing the depletion of print media, as depicted on the right in FIG. 5. The print control device 1 may sequentially display a plurality of guidance screens. In this case, for example, in response to receiving an operation performed on the right button 514 depicted in FIG. 5, the print control device 1 displays a guidance screen on the next page and, in response to receiving an operation performed on the left button 513 depicted in FIG. 5, the print control device 1 displays a guidance screen on the previous page. In replacing the print medium ME1 in a rolled condition, a back feed button is used. Therefore, the controller U2 causes the display 16 to display four software buttons (231, 233, 234, and 235) that receive operations corresponding to four hardware buttons (131, 133, 134, and 135) among the plurality of hardware buttons 130 illustrated in FIG. 1. In response to receiving an operation performed on the back feed button 234, which is a software button, the print control device 1 instructs the print device 100 to perform processing that is performed when an operation performed on the back feed button 134, which is a hardware button, is received. The back feed button 234 has the pattern of the back feed button 134.

On the left in FIG. 6, an ink depletion notification screen 520 for providing a notification of running out of ink is depicted.

In response to receiving, from the print device 100, the state information IN1 indicating depletion of ink as an error state, the print control device 1 displays the guidance display button 521 as well as a message saying, "error: Print device runs out of ink." on the ink depletion notification screen 520. The software buttons 230 displayed on the ink depletion notification screen 520 are the same software buttons (231, 233, and 235) as the software buttons on the home screen 500 depicted in FIG. 4.

In response to receiving an operation performed on the guidance display button 521, the print control device 1 displays a guidance screen 522 for addressing depletion of ink, as depicted on the right in FIG. 6. The controller U2 may cause the display section 16 to sequentially display a plurality of guidance screens. In this case, for example, in response to receiving an operation performed on the right button 524 depicted in FIG. 6, the print control device 1 displays a guidance screen on the next page and, in response to receiving an operation performed on the left button 523 depicted in FIG. 6, the print control device 1 displays a guidance screen on the previous page. In replacing ink, only a pause button for canceling the temporary stop after error cancelation is used. The controller U2 causes the display 16 to display only the pause button 231, which is a software button for receiving an operation corresponding to the pause button 131 among the plurality of hardware buttons 130 illustrated in FIG. 1. In response to receiving an operation performed on the pause button 231, which is a software button, the print control device 1 instructs the print device 100 to perform processing that is performed when an operation performed on the pause button 131, which is a hardware button, is received.

As described above, when the state information IN1 indicates an error state of the print device 100, the controller U2 causes the display 16 to display the guidance screen 512 or 522 for clearing the error state and causes the display 16 to display the software button 230 in accordance with the guidance screen 512 or 522. Accordingly, the controller U2 cause the display 16 to display a screen appearing after switching depending on the state of the print device 100 indicated by the state information IN1 and causes the display 16 to display the software button 230 in accordance with the screen.

When the print device 100 receives an operation performed on the pause button 131 while performing printing according to a print job, the print device 100 stops a printing operation before the print job has finished, generates the state information IN1 indicating the temporary stop state of the printing operation, which is the hold state of the print job, and transmits the state information IN1 to the print control device 1. In addition, when the print control device 1 receives an operation performed on the pause button 231 while the print device 100 is performing printing according to a print job, the print control device 1 causes the print device 100 to stop the printing operation while the printing operation is not finished. In this case, the print device 100 also generates the state information IN1 indicating the temporary stop state of the printing operation, which is the hold state of the print job, and transmits the state information IN1 to the print control device 1.

Figure 7:
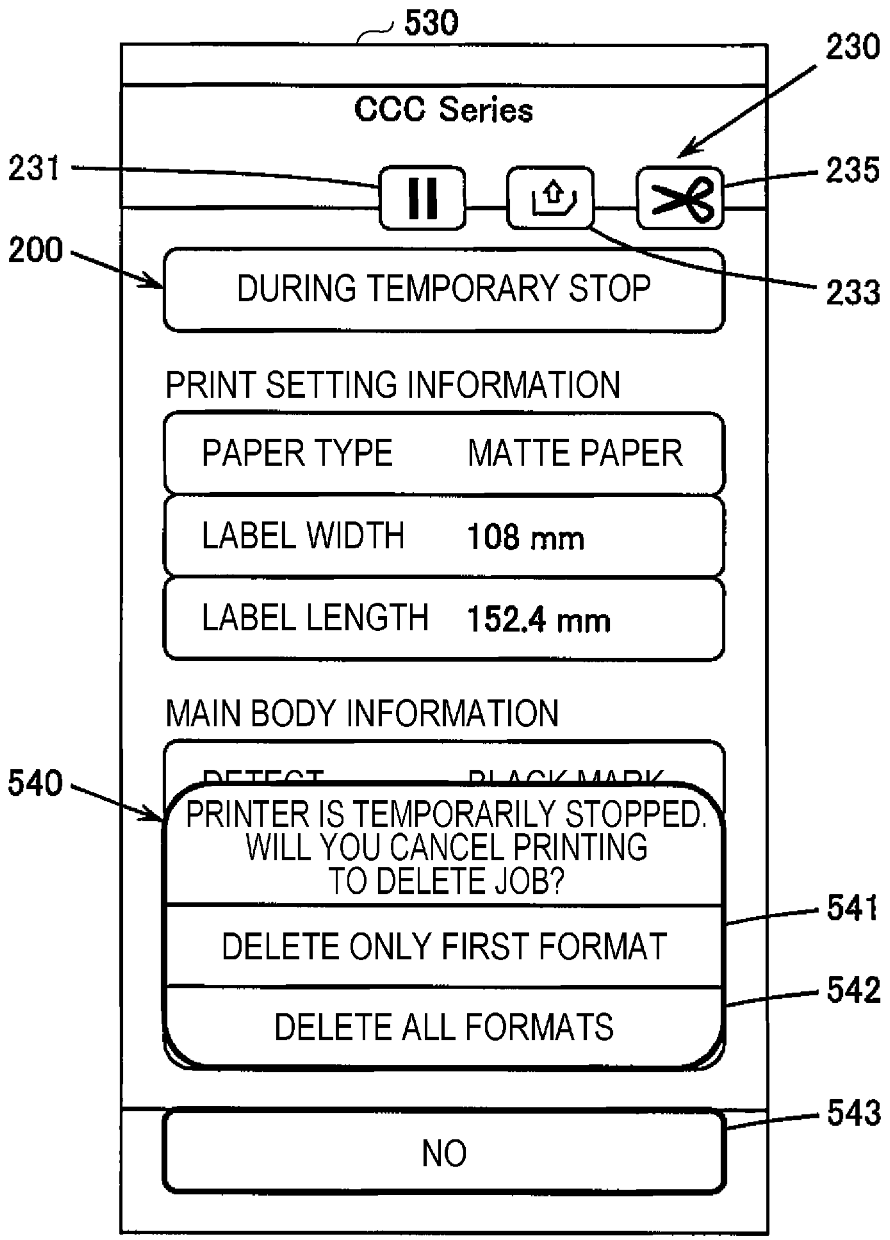
FIG. 7 simply depicts an exemplary display of a temporary stop notification screen.
Figure 8:
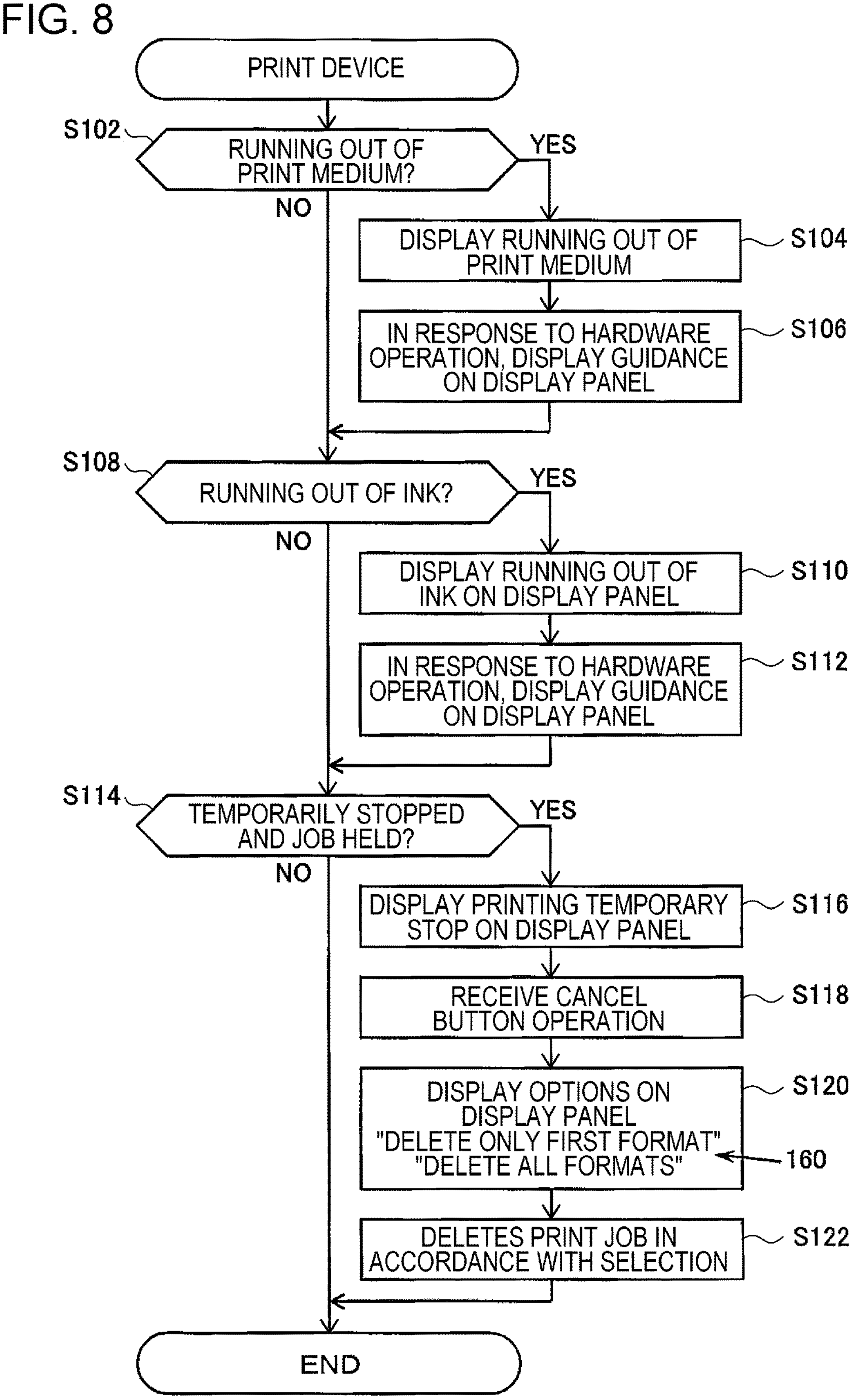
FIG. 8 is a flowchart schematically illustrating an exemplary process of a print device.

In response to receiving the state information IN1 mentioned above, the print control device 1 displays a temporary stop notification screen 530 depicted in FIG. 7 based on the state information IN1.

FIG. 7 depicts the temporary stop notification screen 530 for providing a notification of temporary stop of a printing operation of the print device 100.

In response to receiving, from the print device 100, the state information IN1 indicating the temporary stop state of a printing operation, which is the hold state of a print job, the print control device 1 displays the cancel operation area 540 as well as a message saying, "During temporary stop" on the temporary stop notification screen 530. The software buttons 230 displayed on the temporary stop notification screen 530 are the same software buttons (231, 233, and 235) as the software buttons on the home screen 500 depicted in FIG. 4.

The cancel operation area 540 is an area displayed to overlap the temporary stop notification screen 530 in order to receive an operation of cancelling a print job. The cancel operation area 540 depicted in FIG. 7 includes a top job delete operation area 541, a whole job delete operation area 542, and an area erase operation area 543. When the print control device 1 receives an operation in the top job delete operation area 541, the print control device 1 causes the print device 100 to cancel only the first page of the print job.

When the print control device 1 receives an operation in the whole job delete operation area 542, the print control device 1 causes the print device 100 to cancel the whole of the print job. Accordingly, the controller U2 causes the display 16 to display the cancel operation area 540 that receives a selection of whether to cancel part of the print job or to cancel the whole of the print job. When the print control device 1 receives an operation in the area erase operation area 543, the print control device 1 erases the cancel operation area 540.

First, with reference to FIG. 8, the process of the print device 100 coupled to the print control device 1 will be described. While the print device 100 is powered on, the print device 100 repeats the process illustrated in FIG. 8.

The process illustrated in FIG. 8 starts, the print device 100 determines whether depletion of print media has occurred (step S102). If depletion of print media has occurred, the print device 100 proceeds to step S104; if depletion of print media has not occurred, the print device 100 proceeds to step S108. Hereafter, "step" is omitted. At S104, the print device 100 causes the display panel 121 illustrated in FIGS. 1 and 2 to display the depletion of print media. In addition, the print device 100 transmits the state information IN1 indicating the depletion of print media to the print control device 1. Subsequently, the print device 100 receives an operation performed on a hardware button, such as the left button 136, and, in response to the operation, displays guidance for addressing the depletion of print media on the display panel 121 (S106). The user may replace the print medium ME1 according to the displayed guidance. Then, the print device 100 proceeds to S108.

At S108, the print device 100 determines whether depletion of ink has occurred. If the depletion of ink has occurred, the print device 100 proceeds to step S110; if the depletion of ink has not occurred, the print device 100 proceeds to step S114. At S110, the print device 100 causes the display panel 121 to display the depletion of ink. In addition, the print device 100 transmits the state information IN1 indicating the depletion of ink to the print control device 1. Subsequently, the print device 100 receives an operation performed on a hardware button, such as the left button 136, and, in response to the operation, displays guidance for addressing the depletion of ink on the display panel 121 (S112). The user may replace ink according to the displayed guidance. Then, the print device 100 proceeds to S114.

At S114, the print device 100 determines whether the printing operation is temporarily stopped and whether the print job is held. If the printing operation is temporarily stopped and the print job is held, the print device 100 proceeds to S116; if the printing operation is not temporarily stopped or the print job is not held, the print device 100 terminates the process in FIG. 8. At S116, the print device 100 causes the display panel 121 to display the temporary stop of the printing operation. In addition, the print device 100 transmits the state information IN1 indicating the temporary stop state of the printing operation, which is the hold state of the print job, to the print control device 1. Subsequently, the print device 100 receives an operation performed on the cancel button 132, which is a hardware button for cancelling the print job held by the print device 100 (S118). If an operation performed on the cancel button 132 is not performed, the process keeps stopping at S118. When the cancel button 132 is operated, the print device 100 causes the display panel 121 to display the second cancel operation area 160 for receiving a selection of whether to cancel only the first page of the print job held by the print device 100 or to cancel the whole print job (S120). The second cancel operation area 160 may include an option to avoid cancelling a print job. Finally, the print device 100 receives an operation of selecting an option included in the second cancel operation area 160, deletes a print job in accordance with the selection (S122), and terminates the process illustrated in FIG. 8. When the print device 100 receives an operation of selecting an option "Delete only first format", the print device 100 deletes only the first page of the held print job. When the print device 100 receives an operation of selecting an option "Delete all formats", the print device 1 deletes the whole of the print job held by the print device 100.

Then, with reference to FIG. 9, the process of the print control device 1 will be described. While the print control device 1 is powered on, the print control device 1 repeats the process illustrated in FIG. 9. Here, S200 corresponds to the acquirer U1, the acquiring step ST1, and the acquiring function FU1. S202 to S218 correspond to the controller U2, the controlling step ST2, and the control function FU2.

Upon start of the process illustrated in FIG. 9, the acquirer U1 acquires the state information IN1 from the print device 100 (S200).

After acquiring the state information IN1, the controller U2 determines whether the state information IN1 indicates the depletion of print media, as an error state of the print device 100 (S202). If the state information IN1 indicates the depletion of print media, the controller U2 proceeds to S204; if the state information IN1 does not indicate the depletion of print media, the controller U2 proceeds to S208. At S204, as depicted on the left in FIG. 5, the controller U2 causes the display 16 to display the media depletion notification screen 510 including, as the desired software buttons 230, the pause button 231, the front feed button 233, and the cut button 235. When the input section 15 receives an operation performed on the guidance display button 511, the controller U2 causes the display 16 to display the guidance screen 512 (refer to the right side of FIG. 5) including the back feed button 234 in addition to the software buttons described above (231, 233, and 235) (S206). On the guidance screen 512, guidance for addressing the depletion of print media is displayed. When the input section 15 receives an operation performed on the right button 514 or the left button 513, the controller U2 switches pages of the guidance screen on the display 16. The user may replace the print medium ME1 according to the displayed guidance screen. Then, the controller U2 proceeds to S208.

At S208, the controller U2 determines whether the state information IN1 indicates the depletion of ink, as an error state of the print device 100. If the state information IN1 indicates the depletion of ink, the controller U2 proceeds to S210; if the state information IN1 does not indicate the depletion of ink, the controller U2 proceeds to S214. At S210, as depicted on the left in FIG. 6, the controller U2 causes the display 16 to display the ink depletion notification screen 520 including, as the desired software buttons 230, the pause button 231, the front feed button 233, and the cut button 235. When the input section 15 receives an operation performed on the guidance display button 521, the controller U2 causes the display 16 to display the guidance screen 522 (refer to the right in FIG. 6) including only the pause button 231 as the desired software button 230 (S212). On the guidance screen 522, guidance for addressing the depletion of ink is displayed. When the input section 15 receives an operation performed on the right button 524 or the left button 523, the controller U2 switches pages of the guidance screen on the display 16. The user may replace ink according to the displayed guidance screen. Then, the controller U2 proceeds to S214.

As described above, the controller U2 causes the display 16 to display a screen appearing after switching depending on the state of the print device 100 indicated by the state information IN1 and causes the display 16 to display the software button 230 in accordance with the screen. In particular, when the state information IN1 indicates an error state of the print device 100, the controller U2 causes the display 16 to display the guidance screen 512 or 522 for clearing the error state and causes the display 16 to display the software button 230 in accordance with the guidance screen 512 or 522. Only the software button 230 that is operable during each maintenance operation for the print device 100 is displayed, resulting in reducing the chance of confusion of the user. Accordingly, remote operation of the print device 100 using the software buttons 230 is made easy.

At S214, the controller U2 determines whether the state information IN1 indicates the temporary stop state of the printing operation, which is the hold state of the print job. If the state information IN1 indicates the temporary stop state of the printing operation that is the hold state of the print job, the controller U2 proceeds to S216; if the state information IN1 either does not indicate the temporary stop state of the printing operation or does not indicate the hold state of the print job, the controller U2 terminates the process in FIG. 9. At S216, as depicted in FIG. 7, the controller U2 causes the display 16 to display the temporary stop notification screen 530 as well as the cancel operation area 540. The cancel operation area 540 includes options of whether to cancel only the first page of the print job held by the print device 100 or to cancel of the whole print job. Accordingly, even when a cancel button, which is a software button, is not operated, the cancel operation area 540 corresponding to the second cancel operation area 160, which is described with reference to FIG. 8, is displayed. After the temporary stop notification screen 530 is displayed, when the input section 15 receives an operation of selecting an option of the cancel operation area 540, the controller U2 deletes a print job in accordance with the selected option (S218), and terminates the process illustrated in FIG. 9. When an operation in the top job delete operation area 541, the controller U2 causes the print device 100 to cancel only the first page of the print job; when an operation in the whole job delete operation area 542 is received, the controller U2 causes the print device 100 to cancel the whole print job.

As described above, the software button 230 corresponding to a hardware button selected among the plurality of hardware buttons 130 depending on the state of the print device 100 is displayed on the display 16. Only the software button 230 that is operable for each state of the print device 100 is displayed, resulting in reducing the chance of confusion of the user. Accordingly, the present specific example may facilitate remote operation of the print device 100 using the software buttons 230.

3. SECOND SPECIFIC EXAMPLE OF PRINT SYSTEM

Although the software buttons 230 displayed on the screens depicted in FIGS. 4 to 7 are set in advance, the software buttons 230 may be placed in accordance with the frequency of use of each software button.

FIG. 10 schematically illustrates the structure of a summary table TAL for calculating the frequency of use of each software button. FIG. 11 schematically illustrates the structure of a processing table TA2 defining the placement of software buttons in accordance with the frequency of use. These tables (TAL and TA2) are stored in at least one of the RAM 13 and the storage 14. FIG. 12 simply depicts a change in the home screen. Home screens 551 and 552 depicted in FIG. 12 are displayed instead to the home screen 500 depicted in FIG. 4.

When the print device 100 is powered on, the print device 100 notifies the print control device 1 of the power-on. The controller U2 uses a clock circuit (not illustrated) to measure the time period that has elapsed since the print device 100 was powered on, and stores an on-time period TM (TM>0), which is the total time period during which the print device 100 has been in the on-state since the power of the print device 100 was turned on, in the summary table TA1. In addition, the controller U2 measures the number of times (N1 to N5) that each software button is operated after the print device 100 is powered on, and stores the measured number of times in the summary table TA1. FIG. 10 illustrates the number of pause button operations N1, the number of cancel button operations N2, the number of front feed button operations N3, the number of back feed button operations N4, and the number of cut button operations N5. Here, the number of operations of each software button is denoted by Ni (Ni≥0).

In the processing table TA2 illustrated in FIG. 11, the placement of a software button in accordance with the frequency of operation per hour Ni/TM since the power-on of the print device 100 is defined. As a precondition, software buttons are assumed to be placed such that the larger the frequency of operation Ni/TM, the more to the left a software button is placed. FIG. 11 illustrates that the frequency group is divided into a frequency group G1 in which the frequency of operation per hour Ni/TM is five times or more, a frequency group G2 in which the frequency of operation per hour is one time or more and less than five times, and a frequency group G3 in which the frequency of operation per hour is less than one time. It is defined that a software button of the frequency group G1 is to be placed more to the left than a software button of the frequency group G2 and to have an increased display size. It is defined that a software button of the frequency group G2 is to be placed more to the right than a software button of the frequency group G1 and to have a standard display size. It is defined that the placement of a software button of the frequency group G3 is to be hidden.

For example, it is assumed that the frequency of operation N1/TM of the pause button 231 belongs to the frequency group G1, the frequencies of operation N3/TM and N5/TM of the front feed button 233 and the cut button 235 belong to the frequency group G2, and N3/TM<N5/TM. In this case, as in the home screen 551 depicted on the left in FIG. 12, the pause button 231 is placed furthest to the left and is displayed larger than the other software buttons, and the cut button 235 and the front feed button 233 are displayed in a standard size. In addition, the cut button 235 is placed more to the right than the pause button 231 and more to the left than the front feed button 233.

Then, it is assumed that the cut button 235 has not been used and, as a result, the group to which the frequency of operation N5/TM of the cut button 235 belongs has changed to the frequency group G3. In this case, as in the home screen 552 depicted on the right in FIG. 12, the cut button 235 is not displayed.

As described above, the controller U2 acquires the frequency of use (Ti/TM) of the software button 230 corresponding to each hardware button 130 and causes the display 16 to display the software buttons 230 placed in accordance with the respective frequencies of use (Ti/TM). As a result, the screen of the display 16 displays software buttons suitable for how each user uses the software buttons, which improves the convenience. Accordingly, the present specific example may further facilitate remote operation of the print device 100 using the software buttons 230.

4. THIRD SPECIFIC EXAMPLE OF PRINT SYSTEM

Although the cancel operation area 540 is automatically displayed on the temporary stop notification screen 530 depicted in FIG. 7, the display of the cancel operation area 540 may be omitted when the frequency of use of the cancel operation area 540 is low.

FIG. 13 schematically illustrates the structure of a summary table TA3 for calculating the frequency of use of the cancel operation area 540. The summary table TA3 is stored in at least one of the RAM 13 and the storage 14. FIG. 14 schematically illustrates another process of the print control device 1. In the process illustrated in FIG. 14, S302 is added between S214 and S216 in the process illustrated in FIG. 9.

When the print device 100 is powered on, the print device 100 notifies the print control device 1 of the power-on and measures the number of times NH that the cancel button 132 is operated after the power-on, and notifies the print control device 1 of the measured number of times NH. The controller U2 uses a clock circuit (not illustrated) to measure the time that has elapsed since the print device 100 was powered on, and stores the on-time period TM (TM>0) and the number of operations NH (NH≥0) of the cancel button 132 in the summary table TA3. In addition, the controller U2 measures the number of times NS that the option (541 or 542) of the cancel operation area 540 is operated after the power-on of the print device 100 and stores the measured number of times NS in the summary table TA3. The first frequency of use is the number of times that the cancel button 132, which is a hardware button, is used per hour, and is denoted by NH/TM. The second frequency of use is the number of times that the cancel operation area 540 of software is used per hour, and is denoted by NS/TM. The controller U2, which stores the on-time period TM and the numbers of operations NH and NS in the summary table TA3, may be said to acquire the first frequency of use NH/TM and the second frequency of use NS/TM.

When S200 to S214 illustrated in FIG. 9 are performed and if the controller U2 determines that the state information IN1 indicates the temporary stop state of the printing operation, which is the hold state of the print job, then S302 is performed. At S302, the controller U2 determines whether NH+NS>0 and NS/(NH+NS)>TH, proceeds to S216 if NH+NS>0 and NS/(NH+NS)>TH, and terminates the process in FIG. 14 if NH+NS=0 or NS/(NH+NS)≤TH. Here, the threshold TH is greater than zero and smaller than one. NS/(NH+NS)>TH is rewritten to (NS/TM)>{TH/(1−TH)}×(NH/TM). Accordingly, if the second frequency of use NS/TM exceeds a reference frequency {TH/(1−TH)}×(NH/TM), S216 to S218 are performed; if not, S216 to S218 are not performed.

If NH+NS>0 and NS/(NH+NS)>TH, the controller U2 causes the display 16 to display the temporary stop notification screen 530 as well as the cancel operation area 540 as depicted in FIG. 7 (S216). After the display of the temporary stop notification screen 530, when the input section 15 receives an operation of selecting an option of the cancel operation area 540, the controller U2 deletes a print job in accordance with the selected option (S218) and terminates the process illustrated in FIG. 14.

As described above, if the controller U2 determines that the second frequency of use NS/TM exceeds the reference frequency, the controller U2 causes the display 16 to display the cancel operation area 540; if the controller U2 determines that the second frequency of use NS/TM does not exceed the reference frequency, the controller U2 does not cause the display 16 to display the cancel operation area 540. Since the cancel operation area 540 is displayed by the display 16 when the frequency of use of the cancel operation area 540 is high, the user may easily perform an operation from the print control device 1 when the cancel button 132 is operated. Since the cancel operation area 540 is not displayed by the display 16 when the frequency of use of the cancel operation area 540 is low, the cancel operation area 540 does not hinder the display of the temporary stop notification screen 530. Accordingly, the present specific example may further facilitate operation of the print device 100.

5. MODIFICATIONS

Various modifications of the present disclosure may be considered.

For example, the process described above may be appropriately changed. For example, the order may be changed. For example, in the process illustrated in FIGS. 9, S202 to S206 may be performed after S208 to S212 or after S214 to S218. S208 to S212 may be performed before S202 to S206 or after S214 to S218.

The cancel operation area 540 depicted in FIG. 7 may include a specified page delete operation area for deleting a specified page of a print job, instead of the top job delete operation area 541. In response to receiving an operation into the specified page delete operation area, the print control device 1 may receive specification of a page to be deleted and may cause the print device 100 to delete only the specified page.

6. CONCLUSION

As described above, according to the present disclosure, techniques and so on that facilitate remote control of a print device via software buttons may be provided by various aspects. Of course, techniques including only elements according to the independent claims enables the basic operations and advantages described above to be obtained.

In addition, configurations in which the configurations disclosed in the examples described above are replaced with each other and the combinations thereof are changed, configurations in which the configurations disclosed in the publicly known techniques and examples described above are replaced with each other and the combinations thereof are changed, and so on may be implemented. The present disclosure includes these configurations and so on.

What is claimed is:

1. A print control device coupled to a print device including a plurality of hardware buttons, comprising:

a display; and a Central Processing Unit (CPU) configured to acquire, from the print device, state information indicating a state of the print device, select, in accordance with the state information, among the plurality of hardware buttons, a hardware button to be displayed as a software button by the display, cause the display to display the software button for receiving an operation corresponding to the selected hardware button, and do not cause the display to display the software button corresponding to a not selected hardware button among the plurality of hardware buttons.

2. The print control device according to claim 1, wherein the CPU is further configured to cause the display to display a screen appearing after switching depending on the state of the print device indicated by the state information, and to cause the display to display the software button in accordance with the screen.

3. The print control device according to claim 2, wherein when the state information indicates an error state of the print device, the CPU is further configured to cause the display to display, as the screen, a guidance screen for clearing the error state and to cause the display to display the software button in accordance with the guidance screen.

4. The print control device according to claim 1, wherein the plurality of hardware buttons includes a cancel button for receiving an operation of cancelling a print job held by the print device while an operation of the print device is temporarily stopped, and when the state information indicates a temporary stop state of the operation that is a hold state of the print job, the CPU is further configured to cause the display to display a cancel operation area for receiving the operation of cancelling the print job.

5. The print control device according to claim 4, wherein the print device includes a second display and is configured to, in response to receiving the operation of the cancel button, cause the second display to display a second cancel operation area for receiving a selection of whether to cancel part of the print job held by the print device or to cancel a whole of the print job, and the CPU is further configured to cause the display to display the cancel operation area for receiving the selection of whether to cancel the part of the print job or to cancel the whole of the print job.

6. The print control device according to claim 4, wherein the CPU is further configured to, in response to determining, based on a first frequency of use, the first frequency of use being a frequency at which the cancel button is used, and a second frequency of use, the second frequency of use being a frequency at which the cancel operation area is used, that the second frequency of use exceeds a reference frequency, cause the display to display the cancel operation area, and to, in response to determining that the second frequency of use does not exceed the reference frequency, not cause the display to display the cancel operation area.

7. The print control device according to claim 1, wherein the CPU is further configured to acquire a frequency of use of the software button corresponding to each of the plurality of hardware buttons and to cause the display to display the software button placed in accordance with the frequency of use.

8. A print control method for controlling a print device including a plurality of hardware buttons, comprising:

acquiring, from the print device, state information indicating a state of the print device, selecting, in accordance with the state information, among the plurality of hardware buttons, a hardware button to be displayed as a software button by a display, causing the display to display the software button for receiving an operation corresponding to the selected hardware button, and not causing the display to display the software button corresponding to a not selected hardware button among the plurality of hardware buttons.

9. A non-transitory computer-readable storage medium storing a print control program for controlling a print device including a plurality of hardware buttons, the print control program causing a computer to implement:

acquiring, from the print device, state information indicating a state of the print device, selecting, in accordance with the state information, among the plurality of hardware buttons, a hardware button to be displayed as a software button by a display, causing the display to display the software button for receiving an operation corresponding to the selected hardware button, and not causing the display to display the software button corresponding to a not selected hardware button among the plurality of hardware buttons.

* * * * *